US 11,307,677 B2
Apr. 19, 2022

(12) United States Patent
Joshi

(10) Patent No.: US 11,307,677 B2
(45) Date of Patent: *Apr. 19, 2022

(54) METHOD AND DEVICE FOR OBJECT POINTING IN VIRTUAL REALITY (VR) SCENE USING A GAMEPAD, AND VR APPARATUS

(71) Applicant: TENCENT TECHNOLOGY (SHENZHEN) COMPANY LIMITED, Shenzhen (CN)

(72) Inventor: Dhaval Jitendra Joshi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/105,975

(22) Filed: Nov. 27, 2020

(65) Prior Publication Data

US 2021/0077900 A1    Mar. 18, 2021

Related U.S. Application Data

(63) Continuation of application No. 16/385,739, filed on Apr. 16, 2019, now Pat. No. 10,888,771, which is a
(Continued)

(51) Int. Cl.
*G06F 3/0346*  (2013.01)
*G06F 3/0338*  (2013.01)
(Continued)

(52) U.S. Cl.
CPC .......... *G06F 3/0346* (2013.01); *A63F 13/211* (2014.09); *A63F 13/219* (2014.09);
(Continued)

(58) Field of Classification Search
CPC ........ G06F 3/011; G06F 3/016; G06F 3/0304; G06F 3/0346; G06F 3/04815;
(Continued)

(56) References Cited

U.S. PATENT DOCUMENTS 10,078,377 B2 * 9/2018 Balan .................. G06T 19/006
2007/0061101 A1 3/2007 Greene et al.
(Continued)

FOREIGN PATENT DOCUMENTS

CN    1932725 A    3/2007
CN    105912110 A    8/2016
(Continued)

OTHER PUBLICATIONS

The State Intellectual Property Office of the People's Republic of China (SIPO) Office Action 1 for 201780058397.1 dated Nov. 28, 2019 12 Pages (including translation).
(Continued)

*Primary Examiner* — Darlene M Ritchie
(74) *Attorney, Agent, or Firm* — Anova Law Group, PLLC

(57) ABSTRACT

A method and device for pointing at an object in a Virtual Reality (VR) scene, and a VR apparatus are provided. The method includes sensing a movement of a gamepad from a first position to a second position in a reality scene through an Inertial Measurement Unit (IMU) orientation sensor. The IMU orientation sensor is mounted in the gamepad, and the gamepad is configured to control an object in a VR scene. The method also includes generating a first position vector based on the movement; acquiring a first absolute position coordinate of the second position in the reality scene according to a position coordinate of a starting point in the reality scene and the first position vector; converting the first absolute position coordinate into a first virtual position
(Continued)

coordinate in the VR scene; and pointing at a target object located at the first virtual position coordinate in the VR scene.

20 Claims, 9 Drawing Sheets

Related U.S. Application Data continuation of application No. PCT/CN2017/089792, filed on Jun. 23, 2017.

(51) Int. Cl.
*G06F 3/038* (2013.01)
*G06F 3/04892* (2022.01)
*G06F 3/04842* (2022.01)
*G06F 3/01* (2006.01)
*A63F 13/211* (2014.01)
*A63F 13/219* (2014.01)

(52) U.S. Cl.
CPC .............. *G06F 3/011* (2013.01); *G06F 3/038* (2013.01); *G06F 3/0338* (2013.01); *G06F 3/04842* (2013.01); *G06F 3/04892* (2013.01); *A63F 2300/105* (2013.01); *A63F 2300/1087* (2013.01); *A63F 2300/8082* (2013.01)

(58) Field of Classification Search
CPC .. G06F 3/04842; G06F 3/04892; G06F 3/038; G06F 3/0338; G06F 1/163; A63F 2300/8082; A63F 2300/8076; A63F 2300/1087; A63F 2300/105; A63F 13/25; A63F 13/211; A63F 13/213; A63F 13/31; A63F 13/428; A63F 13/52; A63F 13/577; A63F 13/20; A63F 13/219; G02B 27/0172; G02B 27/017; G02B 27/0138; A63B 2071/0638

See application file for complete search history.

(56) References Cited

U.S. PATENT DOCUMENTS

| | | |
|---|---|---|
| 2010/0113153 A1 | 5/2010 | Yen et al. |
| 2010/0279768 A1 | 11/2010 | Huang et al. |
| 2015/0212330 A1 | 7/2015 | Li et al. |
| 2016/0048994 A1 | 2/2016 | Powers, III et al. |
| 2016/0140763 A1 | 5/2016 | Seichter et al. |
| 2017/0011553 A1 | 1/2017 | Chen et al. |
| 2017/0322623 A1 | 11/2017 | Mckenzie et al. |
| 2017/0336882 A1 | 11/2017 | Tome et al. |
| 2018/0005443 A1 | 1/2018 | Poulos et al. |
| 2018/0136743 A1 | 5/2018 | Seegmiller et al. |
| 2018/0136744 A1 | 5/2018 | Karlsson et al. |
| 2018/0158250 A1 | 6/2018 | Yamamoto et al. |
| 2019/0155397 A1 | 5/2019 | Liu et al. |

FOREIGN PATENT DOCUMENTS

| | | |
|---|---|---|
| CN | 105955461 A | 9/2016 |
| CN | 106249882 A | 12/2016 |
| CN | 106646480 A | 5/2017 |
| CN | 106768361 A | 5/2017 |
| CN | 106774844 A | 5/2017 |
| CN | 106873783 A | 6/2017 |

OTHER PUBLICATIONS

The World Intellectual Property Organization (WIPO) International Search Report for PCT/CN2017/089792 dated Mar. 23, 2018 4 Pages.

\* cited by examiner

METHOD AND DEVICE FOR OBJECT POINTING IN VIRTUAL REALITY (VR) SCENE USING A GAMEPAD, AND VR APPARATUS

CROSS-REFERENCES TO RELATED APPLICATIONS

This application is a continuation application of U.S. patent application Ser. No. 16/385,739, filed on Apr. 16, 2019. U.S. patent application Ser. No. 16/385,739 is a continuation application of PCT Patent Application No. PCT/CN2017/089792, entitled "Method and device for object pointing in Virtual Reality (VR) scene, and VR Apparatus" and filed on Jun. 23, 2017, the entire contents of which are incorporated herein by reference.

TECHNICAL FIELD

The present application relates to the field of VR, and more particularly to a method and device for pointing at an object in a VR scene, and a VR apparatus.

BACKGROUND

At present, there are companies providing control equipment for users to control target objects in VR, and gamepads in VR equipment are widely applied to VR. For example, a Rift helmet has a gamepad for a game player to use well. In a process of interaction between a user and an equipment, pointing at an object is the most basic and most direct operation. However, in a non-game environment or a scene where there is no game player, a gamepad may not directly point at an object, for example, selecting a title or picture in the virtual scene, so that it is difficult to operate the gamepad, and user experiences are reduced.

Since a gamepad may not point at an object, a gamepad with a remote object pointing function is developed, but such a remote object pointing function may achieve a purpose of pointing at an object only by step-by-step movement of an operating key, and requires relatively longer time for pointing at the object, which may cause higher complexity in object pointing. The existing companies do not develop any gamepad for VR equipment because they think that a gamepad without an object pointing function may not provide an immersive experience for a user in a VR scene.

For the problem about operation efficiency of object pointing in a VR scene, there is yet no effective solution disclosed.

SUMMARY

In one embodiment of the present application provides a method and device for pointing at an object in a VR scene, and a VR apparatus, so as to at least solve the technical problem of low operation efficiency of pointing at an object in the VR scene.

According to one embodiment of the present application, a method for pointing at an object in a VR scene is provided. The method includes sensing, by a computing device, a movement of a gamepad from a first position to a second position in a reality scene through an Inertial Measurement Unit (IMU) orientation sensor. The IMU orientation sensor is mounted in the gamepad, and the gamepad is configured to control an object in a VR scene. The method also includes generating, by the computing device, a first position vector based on the movement; acquiring, by the computing device, a first absolute position coordinate of the second position in the reality scene according to a position coordinate of a starting point in the reality scene and the first position vector; converting, by the computing device, the first absolute position coordinate into a first virtual position coordinate in the VR scene; and pointing, by the computing device, at a target object located at the first virtual position coordinate in the VR scene.

According to another embodiment of the present application, a VR apparatus is also provided, which may include: a gamepad, configured to control an object in a VR scene; and an Inertial Measurement Unit (IMU) orientation sensor, mounted in the gamepad, and configured to sense a movement of the gamepad from a first position to a second position in a reality scene. The VR apparatus may also include a processor, connected with the IMU orientation sensor, and configured to generate a first position vector based on the movement sensed by the IMU orientation sensor, acquire a first absolute position coordinate of the second position in the reality scene according to a position coordinate of a starting point in the reality scene and the first position vector; convert the first absolute position coordinate into a first virtual position coordinate in the VR scene; and point at a target object located at the first virtual position coordinate in the VR scene. The VR apparatus may also include a display unit configured to display the VR scene.

According to another embodiment of the present application, a non-transitory computer-readable storage medium storing computer program instructions is provided. The computer program instructions are executable by at least one processor to perform: sensing a movement of a gamepad from a first position to a second position in a reality scene through an Inertial Measurement Unit (IMU) orientation sensor. The IMU orientation sensor is mounted in the gamepad, and the gamepad is configured to control an object in a VR scene. The computer program instructions also cause the at least one processor to perform: generating a first position vector based on the movement; acquiring a first absolute position coordinate of the second position in the reality scene according to a position coordinate of a starting point in the reality scene and the first position vector; converting the first absolute position coordinate into a first virtual position coordinate in the VR scene; and pointing at a target object located at the first virtual position coordinate in the VR scene.

In yet another embodiment of the present application, an IMU orientation sensor is mounted in a gamepad, so as to obtain an absolute position coordinate of the position which the gamepad move to, and then the absolute position coordinate in the reality scene is converted into a virtual position coordinate in the VR scene, and the target object corresponding to the virtual position coordinate in the VR scene is pointed. Through above embodiment, a tedious process of pointing at the target object by operation over an operating key is avoided, and therefore, the technical effect of improving operation efficiency of pointing at an object in the VR scene is achieved, and the technical problem of low operation efficiency of pointing at an object in the VR scene is solved.

BRIEF DESCRIPTION OF THE DRAWINGS

The drawings described here are adopted to provide further understanding of the present application, and form a part of the present application. Schematic embodiments of the present application and descriptions thereof are adopted to explain the present application and not intended to form improper limits to the present application. In the drawings.

DETAILED DESCRIPTION OF THE EMBODIMENTS

In order to make those skilled in the art better understand the solutions of the present application, the technical solutions in the embodiments of the present application will be clearly and completely described below with reference to the drawings in the embodiments of the present application, and obviously, the described embodiments are not all embodiments but only part of the embodiments of the present application. All other embodiments obtained by those skilled in the art on the basis of the embodiments in the present application without creative work shall fall within the scope of protection of the present application.

It is important to note that terms "first", "second" and the like appearing in the specification, claims and drawings of the present application are adopted to distinguish similar objects rather than describe a specific sequence or precedence order. It should be understood that data used like this may be interchanged under a proper condition to implement the embodiments of the present application described here in sequences besides those shown or described here. In addition, terms "include" and "have" and any transformations thereof are intended to cover exclusive inclusions, and for example, a process, method, system, product or equipment including a series of steps or units are not limited to clearly listed steps or units, but may include other steps or units which are not clearly listed or intrinsic to the process, the method, the product or the equipment.

According to one of the embodiments of the present application, a method for pointing at an object in a VR scene is provided.

Figure 1:
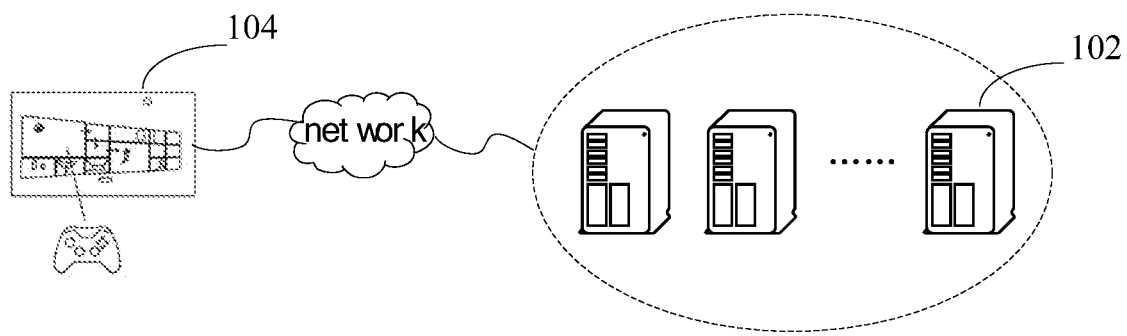
FIG. 1 is a schematic diagram of a hardware environment for a method for pointing at an object in a VR scene according to an embodiment of the present application.

Optionally, the method for pointing at the object in the VR scene may be applied to a hardware environment which, as shown in FIG. 1, is formed by a server 102 and a terminal 104, or may be formed by the terminal 104 itself. FIG. 1 is a schematic diagram of a hardware environment for a method for pointing at an object in a VR scene according to an embodiment of the present application. As shown in FIG. 1, the server 102 is connected with the terminal 104 through a network, the network includes, but not limited to: a wire or wireless network, a wide area network, a metropolitan area network or a local area network, and the terminal 104 is not limited to a VR apparatus, a smart television, a game console (e.g., Nintendo Wii, Microsoft XBOX, Sony Play Station or a PC, etc) with a display or the like. The method for pointing at the object in the VR scene according to one of the embodiments of the present application may be executed by the terminal 104, executed by the server 102, or executed by both the server 102 and the terminal 104, wherein execution of the method for pointing at the object in the VR scene may also be implemented by software installed on a client device.

Figure 2:
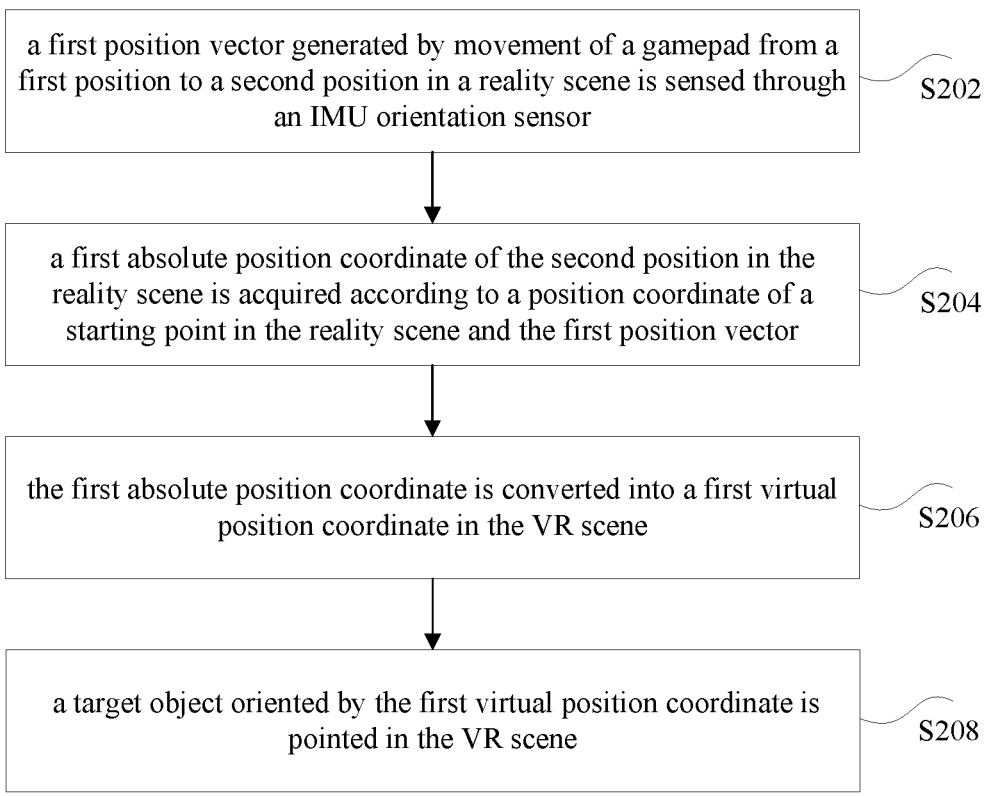
FIG. 2 is flowchart of a method for pointing at an object in a VR scene according to an embodiment of the present application.

FIG. 2 is a flowchart of a method for pointing at an object in a VR scene according to an embodiment of the present application. As shown in FIG. 2, the method may include the following steps.

Step 202: a first position vector generated by movement of a gamepad from a first position to a second position in a reality scene is sensed through an IMU orientation sensor, wherein the IMU orientation sensor is mounted in the gamepad, and the gamepad is configured to control an object in the VR scene.

The IMU orientation sensor is arranged in a controller, senses a three-dimensional coordinate of the controller to determine a position of the controller in a space, and senses a relative position change of the controller to further sense a position change of a physical object in a movement process, and the change may be represented by a position vector. That is, the movement of the gamepad from the first position to the second position in the reality scene can be sensed through the IMU orientation sensor coupled to the controller (e.g., gamepad). The position vector can be generated based on such movement. Optionally, the relative position change of to the physical object is sensed through an optical camera, or may be multiple optical cameras.

The controller may include the gamepad configured for a user to control the object in the VR scene, for example, pointing operation over a target object. The IMU orientation sensor is arranged in the gamepad, and after the gamepad is turned ON, the IMU orientation sensor tracks a position change of the gamepad, and may display a position change result through a display, for example, may display a rotation change result, pitching change result and yawing change result of the gamepad through a head-mounted display.

Position sensing of the gamepad can be implemented through the IMU orientation sensor and/or a tracking system of VR equipment, wherein the tracking system may but is not limited to be configured to sense a position of the IMU orientation sensor, and the tracking system may be connected with IMU orientation sensor. Alternatively, the tracking system comprises a camera and a processor, wherein image data captured by the camera is sent to the processor. The position data of the IMU orientation sensor is generated through the image data being computed by the processor after the image data is received by the processor.

The VR equipment fuses/integrates position data, sensed by the IMU orientation sensor, of the gamepad and position data, sensed by the tracking system, of the IMU orientation sensor, so that position and direction detection of the gamepad may be improved. For example, a Z-axis coordinate detected by the IMU orientation sensor is "a", a Z-axis coordinate detected by the tracking system is "b", and a fusion result, obtained by the VR equipment, of "a" and "b" may be a mean value of "a+b", and may also be the percentage of "a" with "b", or the percentage of "a" with "a+b".

When a movement of the gamepad is detected, the IMU orientation sensor outputs the position vector to indicate that the position of the gamepad has changed. When the gamepad moves from the first position to the second position in the reality scene, the IMU orientation sensor generates the first position vector based on the movement of the gamepad from the first position to the second position.

Step 204: a first absolute position coordinate of the second position in the reality scene is acquired according to a position coordinate of a starting point in the reality scene and the first position vector.

Alternatively, the tracking system in the VR apparatus can acquire the first absolute position coordinate of the second position in the reality scene according to the position coordinate of the starting point in the reality scene and the first position vector.

Alternatively, The position change of the physical object starts from the starting point, the IMU orientation sensor has a sensing starting point, the starting point is determined when the tracking system and the controller are started, is determined only once after the tracking system and the controller are started, and may not change along with movement of the controller, that is, the tracking system outputs the determined starting point, and when the tracking system is restarted, it is necessary to determine a new starting point. Optionally, the starting point in the reality scene is captured by a camera, and may be determined as a point in an image, and the camera may be mounted in a display.

After the first position vector generated by the movement of the gamepad from the first position to the second position in the reality scene is sensed through the IMU orientation sensor, the position coordinate of the starting point in the reality scene is acquired, and the first absolute position coordinate in the reality scene is acquired according to the position coordinate of the starting point in the reality scene and the first position vector, so as to implement fusion of the position coordinate of the starting point and the first position vector sensed by the IMU orientation sensor. In some embodiments, the system may keep updating a current absolute position coordinate of the gamepad. When the gamepad is controlled (e.g., by a user) to implement a first movement from the starting point to position A after the starting point is determined, the system may update the current absolute position coordinate by integrating (e.g., adding) the position coordinate of the starting point and a position vector generated based on the first movement from the starting point to position A. In some embodiments, the first position may be the starting point and the second position may be position A. Further, the absolute position coordinate of a position caused by any subsequent movement can be an integration of the current absolute position coordinate of the gamepad and the position vector generated based on the last movement. In some embodiments, the first position may be a position indicated by the current absolute position coordinate. The second position may be the position where the gamepad stopped from the last movement. After obtaining the absolute position coordinate of the second position, the system may update the current absolute position coordinate to be the absolute position coordinate of the second position.

Step 206: the first absolute position coordinate is converted into a first virtual position coordinate in the VR scene.

After the first absolute position coordinate in the reality scene is acquired according to the position coordinate of the starting point in the reality scene and the first position vector, the first absolute position coordinate is converted into the first virtual position coordinate in the VR scene. A reality space forms a corresponding proportional relationship with the virtual space. For example, the reality scene is a 100-square-meter space, the corresponding VR scene is a 100-square-centimeter space, and the first absolute position coordinate in the reality space may be converted into the first virtual position coordinate in the VR scene through the proportional relationship between the space of the reality scene and the space of the VR scene.

Step 208: a target object located at the first virtual position coordinate is pointed out in the VR scene.

The first virtual position coordinate corresponds to a coordinate of the target object in the VR scene. After the first absolute position coordinate is converted into the first virtual position coordinate in the VR scene, the target object oriented by (i.e., located at) the first virtual position coordinate is pointed in the VR scene. Optionally, after the target object is pointed (e.g., shown as selected) in the VR scene, the target object is operated.

In yet another embodiment, the operation that the target object oriented by the first virtual position coordinate is pointed in the VR scene in Step 208 includes that: a laser pointer is enabled to orient (i.e., point at) the target object in the VR scene, wherein a coordinate of an intersection of the laser pointer and the target object is the first virtual position coordinate. In some embodiments, the laser pointer may be a virtual pointing tool used in the VR scene. The laser pointer may be rendered in the VR scene to mimic functions of a real laser pointer, such as a virtual pointing device shooting out a mono-color beam/ray (e.g., without shadow) in the VR scene, or projecting a laser dot on certain virtual object in the VR scene. The virtual pointing device may be manifested in various virtual forms based on different applications of the VR scene, such as a virtual controller, a virtual hand, a virtual weapon, etc. The virtual laser pointer in the VR scene may be used to reflect the movements of the gamepad in the reality scene. That is, as a user controls the gamepad to move, the virtual laser pointer makes a corresponding movement in the VR scene. As the laser pointer moves, the beam shooting out from the laser point moves and may land on a desired to-be-selected object.

In the VR scene, the target object is determined/identified through the laser pointer, and a position of the laser pointer in the VR scene is determined by the gamepad. When the target object oriented by the first virtual position coordinate is pointed, the laser pointer is oriented toward the target object, and when there is an intersection between the laser pointer (e.g., a ray originating from the laser pointer) and the target object, it is determined that the target object is pointed out, and the coordinate of the intersection is the first virtual position coordinate, so that achievement of a purpose of pointing at the object by step-by-step movement operation over a key is avoided, complexity in pointing operation over the object in the VR scene is reduced, and efficiency of operation over the object in the VR scene is further improved.

In yet another embodiment, the step that the laser pointer is enabled to orient the target object in the VR in Step 208 includes that: the laser pointer is moved from a third position to a fourth position in the VR scene, wherein the laser pointer orients the target object when being positioned at the fourth position in the VR scene, and when the gamepad is positioned at the first position in the reality scene, the laser pointer is positioned at the third position in the VR scene. "The laser pointer orients the target object," as used herein, may refer to a ray/beam originating from the laser pointer intersecting with the target object in the VR space/scene, or the laser pointer being pointing at the target object (e.g., having a beam directed at a location of the target object).

When the gamepad is positioned at the first position in the reality scene, the laser pointer is positioned at the third position in the VR scene, and the third position is a starting position of the laser pointer in the VR scene. When the laser pointer orients the target object in the VR scene, the laser pointer orients the target object when the laser pointer is positioned at the fourth position, and at this moment, the laser pointer stops moving in the VR scene.

In yet another embodiment, the step that the first absolute position coordinate in the VR scene is acquired according to the position coordinate of the starting point in the reality scene and the first position vector in Step 204 includes that: the first absolute position coordinate is acquired according to the position coordinate of the starting point, the first position vector and a second absolute position coordinate, wherein the second absolute position coordinate is a coordinate of the first position in the reality scene.

The first absolute position coordinate is acquired according to the position coordinate of the starting point, the first position vector and the second absolute position coordinate, wherein the second absolute position coordinate is the coordinate of the first position in the reality scene.

The position coordinate of the starting point is determined by the IMU orientation sensor and the tracking system, and when the IMU orientation sensor and the tracking system are started, the position coordinate of the starting point in the reality scene is determined. The IMU orientation sensor generates the position vector, including X-axis, Y-axis and Z-axis position coordinates and also including rolling, yawing and pitching changes. The second absolute position coordinate is the coordinate of the first position in the reality scene, the second absolute position coordinate is acquired, and the first absolute position coordinate in the reality scene is acquired according to the position coordinate of the starting point, the first position vector and the second absolute position coordinate, so that accuracy of the first absolute position coordinate is improved.

In yet another embodiment, before the first absolute position coordinate in the reality scene is acquired according to the position coordinate of the starting point in the reality scene and the first position vector, the position coordinate of the starting point in the reality scene is acquired through the camera.

Before the first absolute position coordinate in the reality scene is acquired according to the position coordinate of the starting point in the reality scene and the first position vector, the position coordinate in the reality scene is determined, and the position coordinate may be acquired through the camera. Optionally, the camera may be mounted in the head-mounted display, and may also be arranged on a platform, and the point in the shot image is determined as the starting point.

In yet another embodiment, after the target object oriented by the first virtual position coordinate is pointed in the VR scene, an operation instruction generated when a key on the gamepad is operated is acquired, and operation indicated by the operation instruction is executed on the target object in the VR scene.

Figure 3:
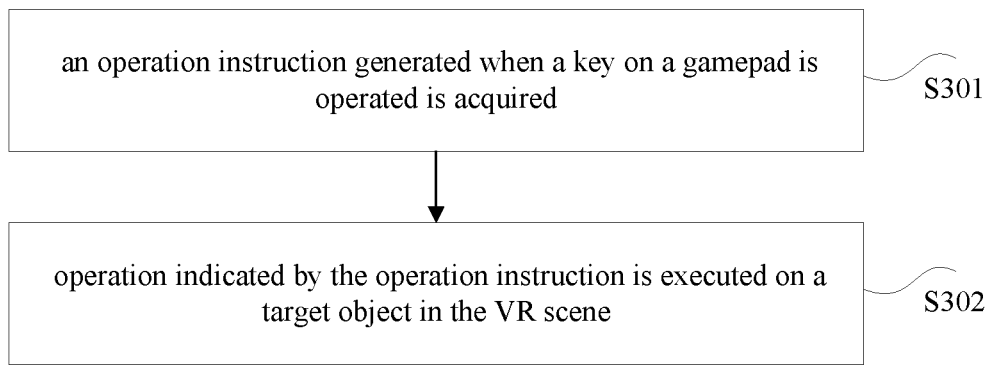
FIG. 3 is a flowchart of another method for pointing at an object in a VR scene according to an embodiment of the present application.

FIG. 3 is a flowchart of another method for pointing at an object in a VR scene according to an embodiment of the present application. As shown in FIG. 3, the method for pointing at the object in the VR scene includes the following steps.

Step 301: an operation instruction generated when a key on a gamepad is operated is acquired.

The key is arranged on the gamepad, and a purpose of operating a target object in the VR scene is achieved by operation over the key. In the VR scene, after the target object oriented by (i.e., located at) a first virtual position coordinate is pointed (e.g., identified/pointed out by the laser pointer), a user may generate the operation instruction by operating the key on the gamepad, the operation instruction may be configured to indicate the target object to move forwards, move backwards, pitch, roll and the like, and the operation instruction is acquired.

Step 302: operation indicated by the operation instruction is executed on a target object in the VR scene.

After the operation instruction generated when the key on the gamepad is operated is acquired, the operation indicated by the operation instruction is executed on the target object in the VR scene, so that efficiency of the operation over the object in the VR scene is improved.

According to the embodiment, after the target object oriented by the first virtual position coordinate is pointed in the VR scene, the operation instruction generated when the key on the gamepad is operated is acquired; and the operation indicated by the operation instruction is executed on the target object in the VR scene, so that the efficiency of the operation over the object in the VR scene is improved.

Figure 4:
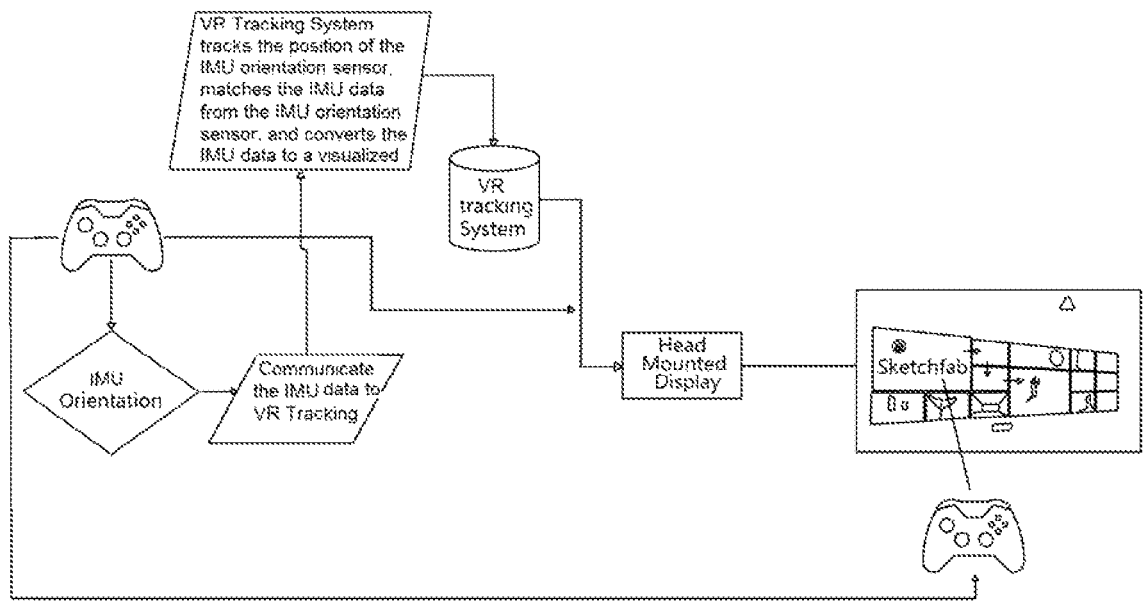
FIG. 4 is a flowchart of object pointing in a VR scene according to an embodiment of the present application.

FIG. 4 is a flowchart of object pointing in a VR scene according to an embodiment of the present application.

An IMU orientation sensor senses a first position vector generated by movement of a gamepad from a first position to a second position in a reality scene, and a VR tracking system tracks the position of the IMU orientation sensor, matches the IMU data from the IMU orientation sensor, and converts the IMU data to a visualized outcome in the VR scene (e.g., moving a laser pointer in the VR scene, adjusting a pointing direction of the laser pointer in the VR scene, etc.). Alternatively, a VR tracking system change of the IMU orientation sensor, fuses the first position vector and a position coordinate of a starting point in the reality scene to obtain a first absolute position coordinate in the reality scene, and converts the first absolute position coordinate into a first virtual position coordinate in a VR scene for display through a head-mounted display; and a user may point a target object oriented by the first virtual position coordinate in the VR scene through the gamepad, and may enable a laser pointer to orient the target object for operation over the target object, so that efficiency of pointing and operation of the target object is improved.

Figure 5:
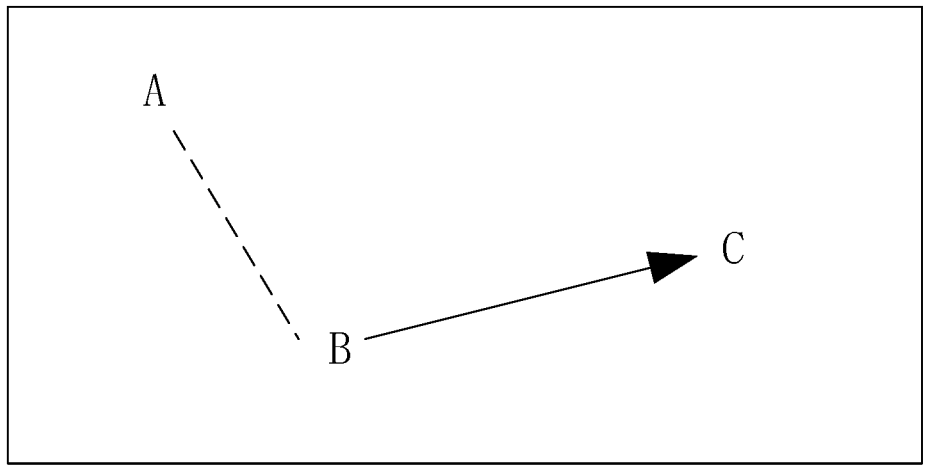
FIG. 5 is a schematic diagram of acquiring a first absolute position coordinate according to a position coordinate of a starting point, a first position vector and a second absolute position coordinate according to an embodiment of the present application.

FIG. 5 is a schematic diagram of acquiring a first absolute position coordinate according to a position coordinate of a starting point, a first position vector and a second absolute position coordinate according to an embodiment of the present application. As shown in FIG. 5, a position of the starting point is A, the first position is B, the second position is C, and the first position vector is a B-to-C vector. The first position vector, i.e. the B-to-C vector, generated by the movement of the gamepad from the first position B to the second position C in the reality scene is sensed through the IMU orientation sensor, and the first absolute position coordinate C' is acquired according to the position coordinate A' of the starting point, the first position vector (B-to-C vector) and a second absolute position coordinate B', wherein the second absolute position coordinate B' is a coordinate of the first position B in the reality scene, so that acquisition of the first absolute position coordinate C' is implemented.

Figure 6:
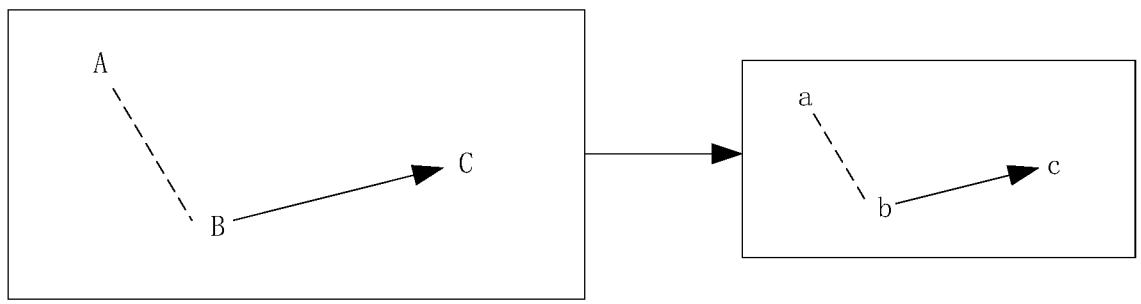
FIG. 6 is a schematic diagram of converting a first absolute position coordinate into a first virtual position coordinate in a VR scene according to an embodiment of the present application.

FIG. 6 is a schematic diagram of converting a first absolute position coordinate into a first virtual position coordinate in a VR scene according to an embodiment of the present application. After the first absolute position coordinate C' in the reality scene is acquired according to the position coordinate A' of the starting point in the reality scene, the first position vector (B-to-C vector) and the second absolute position coordinate B', the first absolute position coordinate C' is converted into the first virtual position coordinate c' in the VR scene. As shown in FIG. 6, VR is a virtual space, and a reality space forms a corresponding proportional relationship with the virtual space. For example, the reality scene is a 100-square-meter space, the corresponding VR scene is a 100-square-centimeter space, the position A of the starting point in the reality scene corresponds to a in the VR scene, the first position B in the reality scene corresponds to b in the VR scene, the second position C in the reality scene corresponds to c in the VR scene, and the first position vector, i.e. the B-to-C vector, corresponds to a b-to-c vector in the VR scene. The first absolute position coordinate C' in the reality space may be converted into the coordinate c' of the first virtual position c in the VR scene through the proportional relationship between the space of the reality scene and the space of the VR scene.

The examples mentioned in other embodiments are also suitable to present embodiment, wherein the same description of the examples are not elaborated again.

Figure 7:
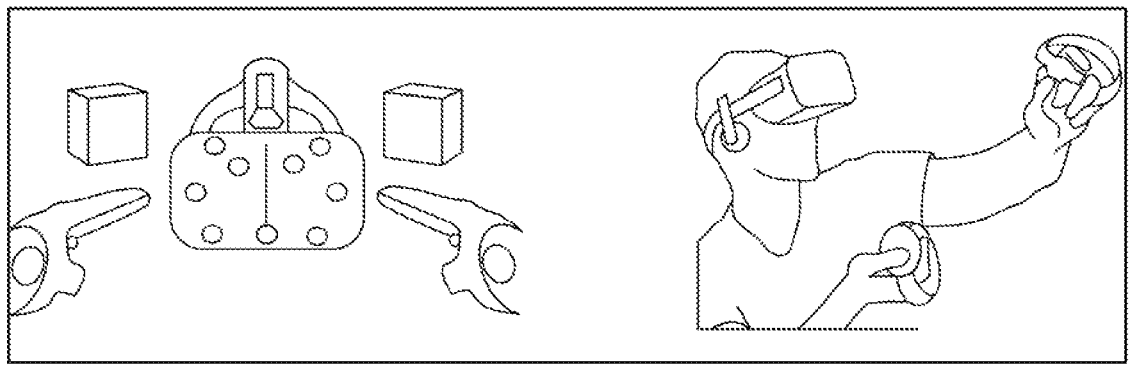
FIG. 7 is a schematic diagram of pointing at an object in a VR scene according to an embodiment of the present application.

FIG. 7 is a schematic diagram of pointing at an object in a VR scene according to an embodiment of the present application. As shown in FIG. 7, a user pointing over a target object in a VR scene may be implemented by operating keys of a controller, the controller may be a gamepad. The VR scene may be presented to the user by a head-mount VR helmet. In some embodiments, the user may operate two gamepads using his/her two hands. The VR scene may correspondingly include two laser pointers, each laser pointer corresponds to one of the gamepads/controllers.

Figure 8:
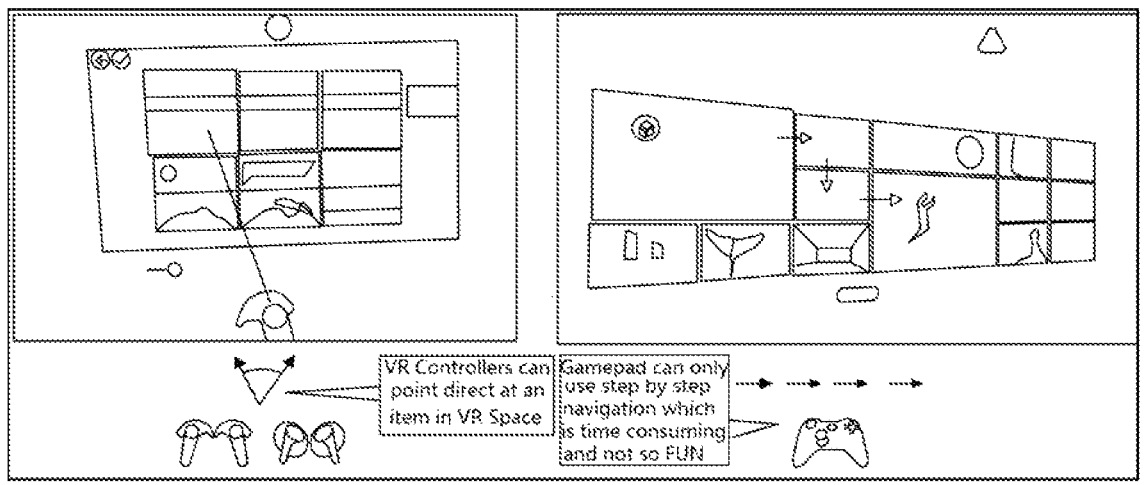
FIG. 8 is another schematic diagram of pointing at an object in a VR scene according to an embodiment of the present application.

FIG. 8 is another schematic diagram of pointing at an object in a VR scene according to an embodiment of the present application. As shown in FIG. 8, a laser pointer is enabled to orient the target object in the VR scene, wherein a coordinate of an intersection between the laser pointer and the target object is a first virtual position coordinate. VR Controllers can point direct at an item in VR Space, so that the object may be directly pointed, and the condition that the object is pointed by step-by-step operation over the key of the gamepad is avoided. Gamepad can only use step by step navigation which is time consuming and not fun.

Figure 9:
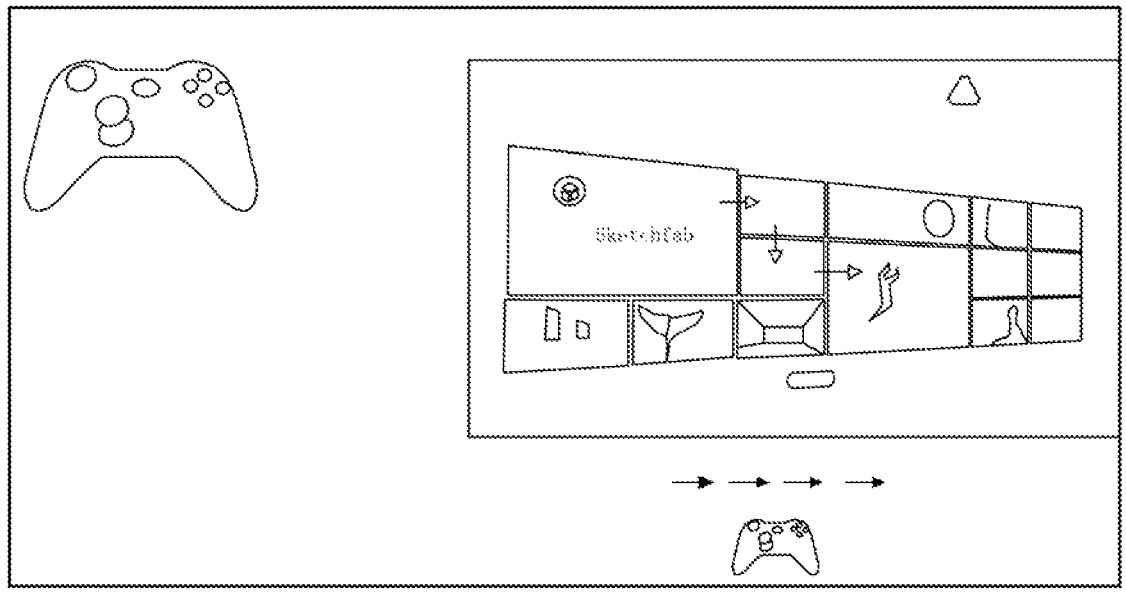
FIG. 9 is another schematic diagram of pointing at an object in a VR scene according to an embodiment of the present application.

FIG. 9 is another schematic diagram of pointing at an object in a VR scene according to an embodiment of the present application. As shown in FIG. 9, an existing gamepad may not track a position of the target object, and may not implement direct pointing, the target object is oriented by movement of the laser pointer to implement pointing of the target object.

Figure 10:
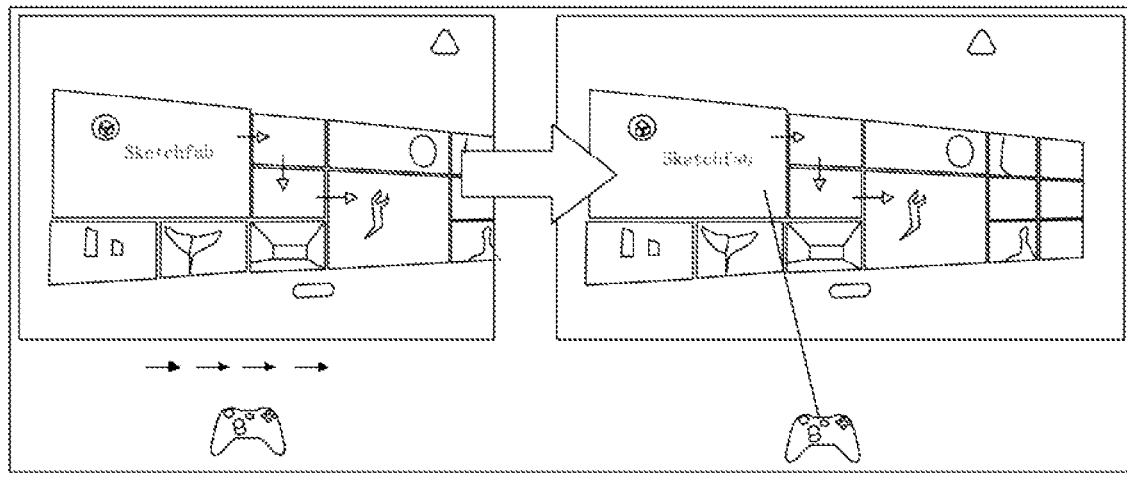
FIG. 10 is another schematic diagram of pointing at an object in a VR scene according to an embodiment of the present application.

FIG. 10 is another schematic diagram of pointing at an object in a VR scene according to an embodiment of the present application. The existing gamepad may be operated step by step through the key, the target object may be directly pointed through the laser pointer, so that efficiency of pointing at the target object in the VR scene is improved. In some embodiments, the disclosed system may utilize existing game pad coupled to IMU sensor (e.g., embedded with IMU sensor or plugged-in with an adaptable IMU sensor) to implement the disclosed pointing function. In this way, the old-fashioned gamepad can also be used to implement the pointing function in the VR scene for operation convenience.

It is important to note that each of the above mentioned embodiments are described as a combination of a series of actions for simple description, but those skilled in the art should know that the present application is not limited to any order. Further, the embodiments may be implemented in software, hardware or the combination thereof.

Figure 11:
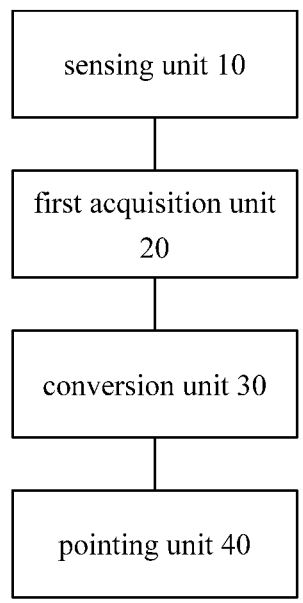
FIG. 11 is a schematic diagram of a device for pointing at an object in a VR scene according to an embodiment of the present application.

FIG. 11 is a schematic diagram of a device for pointing at an object in a VR scene according to an embodiment of the present application. As shown in FIG. 11, the device may include: a sensing unit 10, a first acquisition unit 20, a conversion unit 30 and a pointing unit 40.

The sensing unit 10 is configured to sense a first position vector generated by movement of a gamepad from a first position to a second position in a reality scene through an IMU orientation sensor, wherein the IMU orientation sensor is mounted in the gamepad, and the gamepad is configured to control an object in the VR scene.

When a movement position of the gamepad changes, the IMU orientation sensor outputs the position vector to indicate that the position of the gamepad has changed. When the gamepad moves from the first position to the second position in the reality scene, the sensing unit 10 is configured to enable the IMU orientation sensor to sense the first position vector generated by the movement of the gamepad from the first position to the second position.

The first acquisition unit 20 is configured to acquire a first absolute position coordinate of the second position in the reality scene according to a position coordinate of a starting point in the reality scene and the first position vector.

After the sensing unit 10 senses the first position vector generated by the movement of the gamepad from the first position to the second position in the reality scene through the IMU orientation sensor, the position coordinate of the starting point in the reality scene is acquired through the first acquisition unit 20, and the first absolute position coordinate in the reality scene is acquired according to the position coordinate of the starting point in the reality scene and the first position vector.

The conversion unit 30 is configured to convert the first absolute position coordinate into a first virtual position coordinate in the VR scene.

After the first absolute position coordinate in the reality scene is acquired according to the position coordinate of the starting point in the reality scene and the first position vector through the first acquisition unit 20, the first absolute position coordinate is converted into the first virtual position coordinate in the VR scene through the conversion unit 30. VR is a virtual space, a reality space forms a corresponding proportional relationship with the virtual space, and the first absolute position coordinate in the reality space may be converted into the first virtual position coordinate in the VR scene through the proportional relationship between the space of the reality scene and the space of the VR scene.

The pointing unit 40 is configured to point a target object oriented by the first virtual position coordinate in the VR scene.

The first virtual position coordinate corresponds to a coordinate of the target object in the VR scene. After the first absolute position coordinate is converted into the first virtual position coordinate in the VR scene through the conversion unit 30, the target object oriented by the first virtual position coordinate is pointed in the VR scene. Optionally, after the target object is pointed in the VR scene, the target object is operated.

Figure 12:
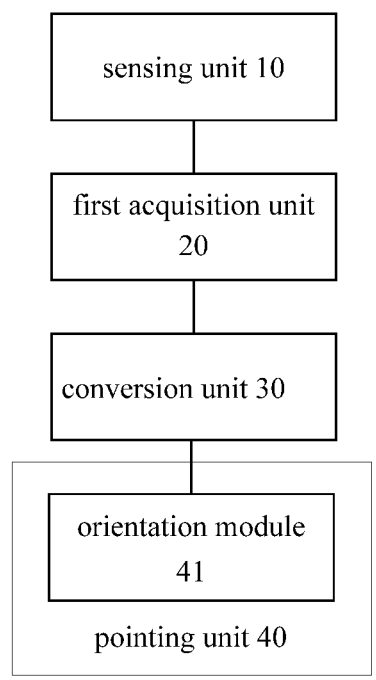
FIG. 12 is a schematic diagram of another device for pointing at an object in a VR scene according to an embodiment of the present application.

FIG. 12 is a schematic diagram of another device for pointing at an object in a VR scene according to an embodiment of the present application. As shown in FIG. 12, the device for pointing at the object in the VR scene may include: a sensing unit 10, a first acquisition unit 20, a conversion unit 30 and a pointing unit 40, wherein the pointing unit 40 includes: an orientation module 41.

It is important to note that the sensing unit 10, first acquisition unit 20, conversion unit 30 and pointing unit 40 of the embodiment have functions the same as those in the device for pointing at the object in the VR scene shown in FIG. 11, and will not be elaborated herein.

The orientation module 41 is configured to enable a laser pointer to orient a target object in the VR scene, wherein a coordinate of an intersection between the laser pointer and the target object is a first virtual position coordinate.

Figure 13:
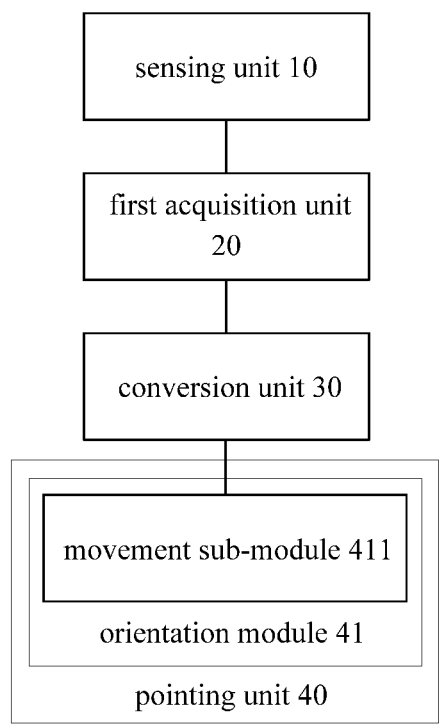
FIG. 13 is a schematic diagram of another device for pointing at an object in a VR scene according to an embodiment of the present application.

FIG. 13 is a schematic diagram of another device for pointing at an object in a VR scene according to an embodiment of the present application. As shown in FIG. 13, the device for pointing at the object in the VR scene may include: a sensing unit 10, a first acquisition unit 20, a conversion unit 30 and a pointing unit 40, wherein the pointing unit 40 includes: an orientation module 41, wherein the orientation module 41 includes: a movement sub-module 411.

It is important to note that the sensing unit 10, first acquisition unit 20, conversion unit 30, pointing unit 40 and orientation module 41 of the embodiment have functions the same as those in the device for pointing at the object in the VR scene shown in FIG. 12, and will not be elaborated herein.

The movement sub-module 411 is configured to move a laser pointer from a third position to a fourth position in the VR scene, wherein the laser pointer orients a target object when being positioned at the fourth position in the VR scene, and when a gamepad is positioned at a first position in a reality scene, the laser pointer is positioned at the third position in the VR scene.

Optionally, the first acquisition unit 20 is configured to acquire a first absolute position coordinate according to a position coordinate of a starting point, a first position vector and a second absolute position coordinate, wherein the second absolute position coordinate is a coordinate of the first position in the reality scene.

Figure 14:
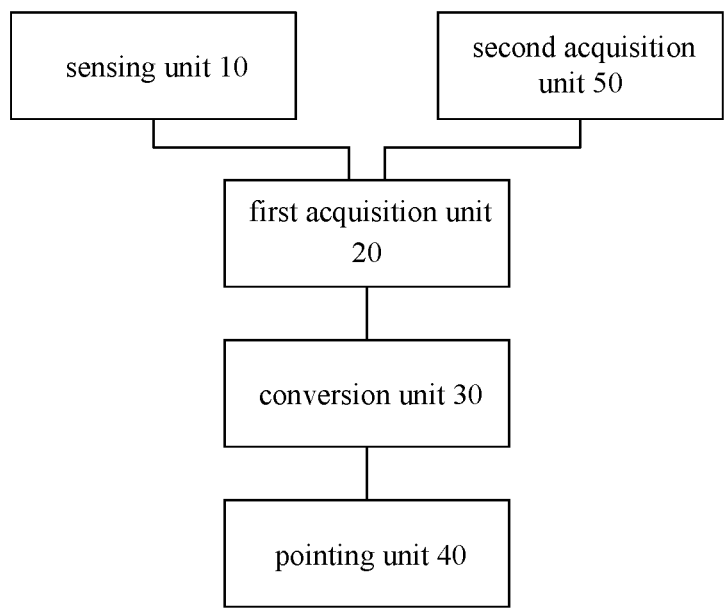
FIG. 14 is a schematic diagram of another device for pointing at an object in a VR scene according to an embodiment of the present application.

FIG. 14 is a schematic diagram of another device for pointing at an object in a VR scene according to an embodiment of the present application. As shown in FIG. 14, the device may include: a sensing unit 10, a first acquisition unit 20, a conversion unit 30 and a pointing unit 40. The device for pointing at the object in the VR scene may further include: a second acquisition unit 50.

It is important to note that the sensing unit 10, first acquisition unit 20, conversion unit 30 and pointing unit 40 of the embodiment have functions the same as those in the device for pointing at the object in the VR scene shown in FIG. 11, and will not be elaborated herein.

The second acquisition unit 50 is configured to, before a first absolute position coordinate in a reality scene is acquired according to a position coordinate of a starting point in the reality scene and a first position vector, acquire the position coordinate of the starting point in the reality scene through the camera, wherein the starting point is a point in an image shot by the camera.

Optionally, the device for pointing at the object in the VR scene shown in FIG. 11 to FIG. 14 further includes: a third acquisition unit and an execution unit, wherein the third acquisition unit is configured to, after the target object oriented by the first virtual position coordinate is pointed in the VR scene, acquire an operation instruction generated when a key on the gamepad is operated; and the execution unit is configured to execute an operation indicated by the operation instruction on the target object in the VR scene.

It is important to note that the sensing unit 10 may be configured to execute Step 202, the first acquisition unit 20 may be configured to execute Step 204, the conversion unit 30 may be configured to execute Step 206, and the pointing unit 40 may be configured to execute Step 208 as described above.

In one of the embodiments, the sensing unit 10 senses the first position vector generated by the movement of the gamepad from the first position to the second position in the reality scene through the IMU orientation sensor, wherein the sensor is mounted in the gamepad, and the gamepad is configured to control the object in the VR scene; the first absolute position coordinate in the reality scene is acquired according to the position coordinate of the starting point in the reality scene and the first position vector through the first acquisition unit 20; the first absolute position coordinate is converted into the first virtual position coordinate in the VR scene through the conversion unit 30; and the target object oriented by the first virtual position coordinate is pointed in the VR scene through the pointing unit 40, so that the technical problem of low operation efficiency of pointing at an object in the VR scene is solved, and the technical effect of improving operation efficiency of pointing at an object in the VR scene is further achieved.

It is important to note here that the abovementioned units and modules implement examples and application scenes the same as those implemented by the corresponding steps, but not limited to contents disclosed in the abovementioned embodiments. It is important to note that the modules, as a part of the device, may run in the hardware environment shown in FIG. 1, may be implemented by software, and may also be implemented by hardware, wherein the hardware environment includes a network environment.

Figure 15:
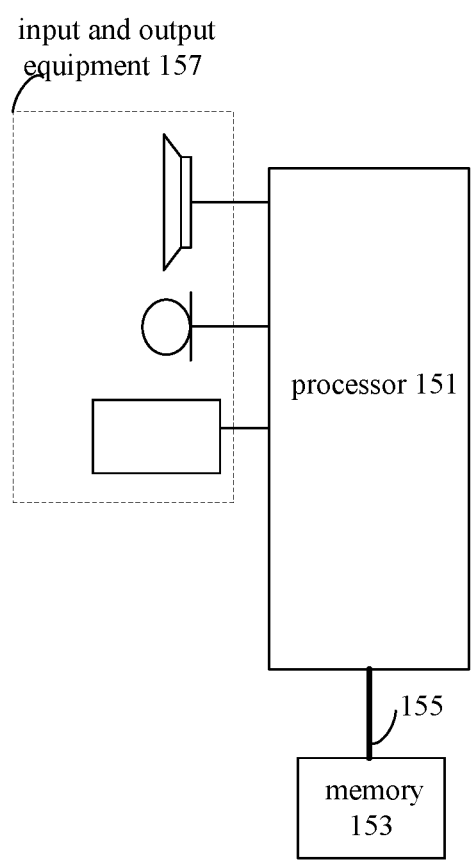
FIG. 15 is a structure block diagram of a terminal according to an embodiment of the present application.

FIG. 15 is a structure block diagram of a terminal according to an embodiment of the present application. As shown in FIG. 15, the terminal may include: one or more (only one is shown in the figure) processor 151, a memory 153 and a transmission device 155, and as shown in FIG. 15, the terminal may further include input and output equipment 157.

Wherein, the memory 153 may be configured to store a software program and a module, such as a program instruction/module corresponding to a method and device for pointing at an object in a VR scene of the present disclosure, and the processor 151 runs the software program and module stored in the memory 153, thereby executing various function applications and data processing, namely implementing the abovementioned method for pointing at the object in the VR scene. The memory 153 may include a high-speed RAM, and may further include a non-volatile memory, such as one or more magnetic storage devices, a flash memory or another non-volatile solid-state memory. In some embodiments, the memory 153 may further include a memory remotely arranged relative to the processor 151, and these remote memories may be connected to the terminal through a network. An example of the network includes, but not limited to, the Internet, an intranet of an enterprise, a local area network, a mobile communication network and a combination thereof.

The transmission device 155 is configured to receive or send data through a network, and may also be configured for data transmission between the processor and the memory. A specific example of the network may include a wired network and a wireless network. In an example, the transmission device 155 includes a Network Interface Controller (NIC), which may be connected with a router through a network cable and other network equipment, thereby communicating with the Internet or the local area network. In an example, the transmission device 155 is a Radio Frequency (RF) module, which is configured to communicate with the Internet in a wireless manner.

Wherein, the memory 153 is specifically configured to store an application program.

The processor 151 may call the application program stored in the memory 153 through the transmission device 155 to execute the following steps:

sensing a first position vector generated by movement of a gamepad from a first position to a second position in a reality scene through an IMU orientation sensor, wherein the IMU orientation sensor is mounted in the gamepad, and the gamepad is configured to control an object in a VR scene;

acquiring a first absolute position coordinate of the second position in the reality scene according to a position coordinate of a starting point in the reality scene and the first position vector;

converting the first absolute position coordinate into a first virtual position coordinate in the VR scene; and pointing at a target object oriented by the first virtual position coordinate in the VR scene.

The processor 151 is further configured to execute the following step: enabling a laser pointer to orient the target object in the VR scene, wherein a coordinate of an intersection of the laser pointer and the target object is the first virtual position coordinate.

The processor 151 is further configured to execute the following step: moving the laser pointer from a third position to a fourth position in the VR scene, wherein the laser pointer orients the target object when being positioned at the fourth position in the VR scene, and when the gamepad is positioned at the first position in the reality scene, the laser pointer is positioned at the third position in the VR scene.

The processor 151 is further configured to execute the following step: acquiring the first absolute position coordinate according to the position coordinate of the starting point, the first position vector and a second absolute position coordinate, wherein the second absolute position coordinate is a coordinate of the first position in the reality scene.

The processor 151 is further configured to execute the following step: before acquiring the first absolute position coordinate in the reality scene according to the position coordinate of the starting point in the reality scene and the first position vector, acquiring the position coordinate of the starting point in the reality scene through a camera, wherein the starting point is a point in an image shot by the camera.

The processor 151 is further configured to execute the following steps: after pointing at the target object oriented by the first virtual position coordinate in the VR scene, acquiring an operation instruction generated when a key on the gamepad is operated; and executing an operation indicated by the operation instruction on the target object in the VR scene.

Optionally, specific examples may refer to the examples described in the abovementioned embodiments, and will not be elaborated herein.

Those skilled in the art should know that the structure shown in FIG. 15 is only schematic, and the terminal may be terminal equipment such as a smart phone (such as an Android phone and an iOS phone), a tablet computer, a palmtop computer, a Mobile Internet Device (MID) and a PAD. FIG. 15 is not intended to form limits to the structure of the electronic device. For example, the terminal may further include components (such as a network interface and a display device) more or fewer than those shown in FIG. 15, or has a configuration different from that shown in FIG. 15.

Those skilled in the art should know that all or part of the steps in various methods of the above mentioned embodiments may be implemented by related hardware, instructed by a program, of the terminal equipment, the program may be stored in a computer-readable storage medium, and the storage medium may include: a flash disk, a ROM, a RAM, a magnetic disk, a compact disc or the like.

Figure 16:
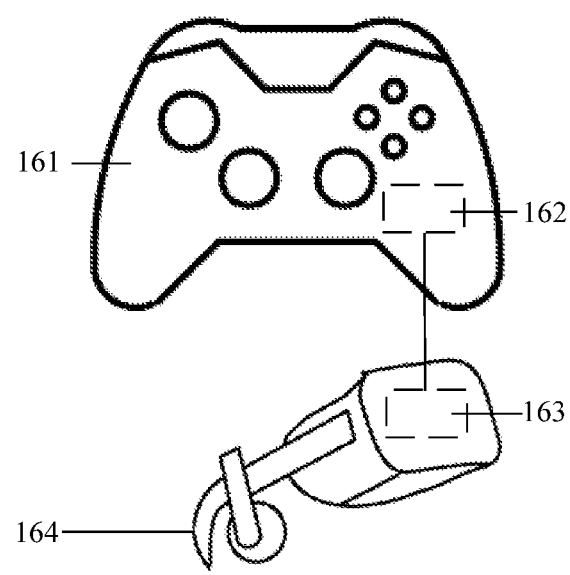
FIG. 16 is a schematic diagram of a VR apparatus according to an embodiment of the present application.

FIG. 16 is a schematic diagram of a VR apparatus according to an embodiment of the present application. As shown in FIG. 16, a Virtual Reality (VR) apparatus comprises: a gamepad 161, configured to control an object in a VR scene; an Inertial Measurement Unit (IMU) orientation sensor 162, mounted in the gamepad 161, and configured to sense a first position vector generated by movement of the gamepad 161 from a first position to a second position in a reality scene; a processor 163, connected with the IMU orientation sensor 162, and configured to acquire a first absolute position coordinate of the second position in the reality scene according to a position coordinate of a starting point in the reality scene and the first position vector; convert the first absolute position coordinate into a first virtual position coordinate in the VR scene; and point a target object oriented by the first virtual position coordinate in the VR scene; a display unit 164, configured to display the VR scene.

Alternatively, the processor 163 is configured to point the target object oriented by the first virtual position coordinate in the VR scene by following steps: enabling a laser pointer to orient the target object in the VR scene, wherein a coordinate of an interaction/intersection of the laser pointer and the target object is the first virtual position coordinate.

Alternatively, the processor 163 is configured to enable the laser pointer to orient the target object in the VR scene by following steps: moving the laser pointer from a third position to a fourth position in the VR scene, wherein the laser pointer orients the target object when being positioned at the fourth position in the VR scene, and when the gamepad 161 is positioned at the first position in the reality scene, the laser pointer is positioned at the third position in the VR scene.

Alternatively, the processor 163 is configured to acquire the first absolute position coordinate of the second position in the reality scene according to the position coordinate of the starting point in the reality scene and the first position vector by following steps: acquiring the first absolute position coordinate according to the position coordinate of the starting point, the first position vector and a second absolute position coordinate, wherein the second absolute position coordinate is a coordinate of the first position in the reality scene.

Alternatively, the VR apparatus further comprises a camera, configured to acquire the position coordinate of the starting point in the reality scene through a camera, wherein the starting point is a point in an image shot by the camera, before the processor 163 acquires the first absolute position coordinate of the second position in the reality scene according to the position coordinate of the starting point in the reality scene and the first position vector.

Alternatively, the embodiment does not make the limitation on the position of the camera, for example, the camera can be in the gamepad 161 or can be in the display unit 164, or in the other unit of the VR apparatus.

Alternatively, the processor 163 is further configured to, after pointing at the target object oriented by the first virtual position coordinate in the VR scene, acquire an operation instruction generated when a key on the gamepad 161 is operated; and execute an operation indicated by the operation instruction on the target object in the VR scene.

Alternatively, the embodiment does not make the limitation on the position of the processor 163, for example, the processor 163 can be in the gamepad 161 or can be in the display unit 164.

The examples mentioned in other embodiments are also suitable to present embodiment, wherein the same description of the examples are not elaborated again. The embodiment of the present application further provides a storage medium.

Optionally, the storage medium in the embodiments may be configured to store a program code for executing a method for pointing at an object in a VR scene.

Optionally, the storage medium in the embodiments may be positioned on at least one piece of network equipment in multiple pieces of network equipment in a network shown in the abovementioned embodiment.

Optionally, the storage medium in the embodiments is configured to store a program code configured to execute the following steps: sensing a first position vector generated by movement of a gamepad from a first position to a second position in a reality scene through an IMU orientation sensor, wherein the IMU orientation sensor is mounted in the gamepad, and the gamepad is configured to control an object in a VR scene; acquiring a first absolute position coordinate of the second position in the reality scene according to a position coordinate of a starting point in the reality scene and the first position vector; converting the first absolute position coordinate into a first virtual position coordinate in the VR scene; and pointing at an target object oriented by the first virtual position coordinate in the VR scene.

In an embodiment of the present application, an IMU orientation sensor is mounted in a gamepad, so as to obtain an absolute position coordinate of the position which the gamepad move to, and then the absolute position coordinate in the reality scene is converted into a virtual position coordinate in the VR scene, and the target object corresponding to the virtual position coordinate in the VR scene is pointed. Through above embodiment, a tedious process of pointing at the target object by operation over an operating key is avoided, and therefore, the technical effect of improving operation efficiency of pointing at an object in the VR scene is achieved, and the technical problem of low operation efficiency of pointing at an object in the VR scene is solved.

Optionally, the storage medium is further configured to store a program code configured to execute the following step: enabling a laser pointer to orient the target object in the VR scene, wherein a coordinate of an intersection of the laser pointer and the target object is the first virtual position coordinate.

Optionally, the storage medium is further configured to store a program code configured to execute the following step: moving the laser pointer from a third position to a fourth position in the VR scene, wherein the laser pointer orients the target object when being positioned at the fourth position in the VR scene, and when the gamepad is positioned at the first position in the reality scene, the laser pointer is positioned at the third position in the VR scene.

Optionally, the storage medium is further configured to store a program code configured to execute the following step: acquiring the first absolute position coordinate according to the position coordinate of the starting point, the first position vector and a second absolute position coordinate, wherein the second absolute position coordinate is a coordinate of the first position in the reality scene.

Optionally, the storage medium is further configured to store a program code configured to execute the following step: before acquiring the first absolute position coordinate in the reality scene according to the position coordinate of the starting point in the reality scene and the first position vector, acquiring the position coordinate of the starting point in the reality scene through a camera, wherein the starting point is a point in an image shot by the camera.

Optionally, the storage medium is further configured to store a program code configured to execute the following steps: after pointing at the target object oriented by the first virtual position coordinate in the VR scene, acquiring an operation instruction generated when a key on the gamepad is operated; and executing an operation indicated by the operation instruction on the target object in the VR scene.

Optionally, specific examples in the embodiments may refer to the examples described in the above mentioned embodiments, and will not be elaborated herein.

Optionally, the storage medium in the embodiments may include, but not limited to: various media capable of storing program codes such as a U disk, a ROM, a RAM, a mobile hard disk, a magnetic disk or a compact disc.

Sequence numbers of the embodiments of the present application are only adopted for description, and may not represent quality of the embodiments.

If being implemented in form of software function unit and sold or used as an independent product, the integrated unit may be stored in the computer-readable storage medium. Based on such an understanding, the technical solution of the embodiment of the present application substantially or a part with contributions to the conventional art or all or part of the technical solution may be embodied in form of software product, and the computer software product is stored in a storage medium, including a plurality of instructions configured to enable one or more pieces of computer equipment (which may be personal computers, servers, network equipment or the like) to execute all or part of the steps of the method in each embodiment of the disclosure.

In the above mentioned embodiments of the present application, each embodiment is described with different special emphasis, and parts which are not detailed in a certain embodiment may refer to related descriptions in the other embodiments.

In some embodiments provided by the present application, it should be understood that the disclosed client may be implemented in another manner. Wherein, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection implemented through some interfaces, and may also be electrical or adopt other forms.

The units described as separate parts may or may not be physically separated, and parts displayed as units may or may not be physical units, and namely may be located in the same place, or may also be distributed to multiple network units. Part or all of the units may be selected to achieve a purpose of the solutions of the embodiment according to a practical requirement.

In addition, each function unit in each embodiment of the present application may be integrated into a processing unit, each unit may also physically exist independently, and two or more than two units may also be integrated into a unit. The integrated unit may be implemented in a hardware form, and may also be implemented in form of software function unit.

The above is only the preferred implementation mode of the present application, it is important to note that those skilled in the art may also make a plurality of improvements and embellishments without departing from the principle of the present application, and these improvements and embellishments shall also fall within the scope of protection of the present application.

What is claimed is:

1. A method for pointing at an object in a Virtual Reality (VR) scene, comprising:
sensing, by a computing device, a movement of a gamepad from a first position to a second position in a reality scene through an Inertial Measurement Unit (IMU) orientation sensor, wherein the gamepad is an old-fashioned gamepad, the IMU orientation sensor is either plugged to or embedded in the gamepad, and the gamepad is configured to, in an object selection scenario in a VR scene and in response to the movement of the gamepad sensed through the IMU orientation sensor, trigger a movement of a virtual pointer to point at an object according to a proportional relationship between a space of the reality scene and a space of the virtual scene, the VR scene being presented by a head-mounted display;
generating, by the computing device, a first position vector based on the movement of the gamepad;
acquiring, by the computing device, a first absolute position coordinate of the second position in the reality scene according to a position coordinate of a starting point in the reality scene and the first position vector;
converting, by the computing device, the first absolute position coordinate into a first virtual position coordinate in the VR scene;
pointing, by the computing device, at a target object located at the first virtual position coordinate in the VR scene, wherein when pointing at the target object, the target object is selected and changed into an operable state; and
executing an operation on the target object at the operable state in the VR scene in response to an instruction from a key of the gamepad.

2. The method according to claim 1, wherein acquiring the first absolute position coordinate of the second position in the reality scene according to the position coordinate of the starting point in the reality scene and the first position vector comprises:
acquiring the first absolute position coordinate according to the position coordinate of the starting point, the first position vector and a second absolute position coordinate, wherein the second absolute position coordinate is a coordinate of the first position in the reality scene.

3. The method according to claim 1, wherein pointing at the target object oriented by the first virtual position coordinate in the VR scene comprises:
orienting a laser pointer toward the target object located at the first virtual position coordinate in the VR scene, wherein a coordinate of an intersection of a ray originated from the laser pointer and the target object is the first virtual position coordinate.

4. The method according to claim 3, wherein orienting the laser pointer toward the target object in the VR scene comprises:
moving the laser pointer from a third position to a fourth position in the VR scene, wherein the laser pointer orients the target object when being positioned at the fourth position in the VR scene, and when the gamepad is positioned at the first position in the reality scene, the laser pointer is positioned at the third position in the VR scene.

5. The method according to claim 3, further comprising:
when the laser pointer points at the target object, displaying the target object as the operable state in the VR scene.

6. The method according to claim 1, before acquiring the first absolute position coordinate of the second position in the reality scene according to the position coordinate of the starting point in the reality scene and the first position vector, the method further comprising:
acquiring the position coordinate of the starting point in the reality scene through a camera.

7. The method according to claim 6, wherein the starting point is a point in an image shot by the camera.

8. A Virtual Reality (VR) apparatus, comprising:
a gamepad, configured to, in an object selection scenario in a VR scene and in response to the movement of the gamepad sensed through the IMU orientation sensor, trigger a movement of a virtual pointer to point at an object according to a proportional relationship between a space of the reality scene and a space of the virtual scene, the gamepad being an old-fashioned gamepad;
an Inertial Measurement Unit (IMU) orientation sensor, either plugged to or embedded in the gamepad, and configured to sense a movement of the gamepad from a first position to a second position in a reality scene;
a processor, connected with the IMU orientation sensor, and configured to:
generate a first position vector based on the movement sensed by the IMU orientation sensor;
acquire a first absolute position coordinate of the second position in the reality scene according to a position coordinate of a starting point in the reality scene and the first position vector;

convert the first absolute position coordinate into a first virtual position coordinate in the VR scene;

point at a target object located at the first virtual position coordinate in the VR scene, wherein when pointing at the target object, the target object is selected and changed into an operable state; and execute an operation on the target object at the operable state in the VR scene in response to an instruction from a key of the gamepad, a head-mounted display unit, configured to display the VR scene.

9. The VR apparatus according to claim 8, wherein the processor is further configured to:

acquire the first absolute position coordinate according to the position coordinate of the starting point, the first position vector and a second absolute position coordinate, wherein the second absolute position coordinate is a coordinate of the first position in the reality scene.

10. The VR apparatus according to claim 8, wherein the processor is further configured to, when the laser pointer points at the target object, display the target object as the operable state in the VR scene.

11. The VR apparatus according to claim 8, wherein the processor is further configured to:

orient a laser pointer toward the target object located at the first virtual position coordinate in the VR scene, wherein a coordinate of an intersection of a ray originated from the laser pointer and the target object is the first virtual position coordinate.

12. The VR apparatus according to claim 11, wherein the processor is further configured to:

move the laser pointer from a third position to a fourth position in the VR scene, wherein the laser pointer orients the target object when being positioned at the fourth position in the VR scene, and when the gamepad is positioned at the first position in the reality scene, the laser pointer is positioned at the third position in the VR scene.

13. The VR apparatus according to claim 8, further comprising:

a camera, configured to acquire the position coordinate of the starting point in the reality scene, before the processor acquires the first absolute position coordinate of the second position in the reality scene according to the position coordinate of the starting point in the reality scene and the first position vector.

14. The VR apparatus according to claim 13, wherein the starting point is a point in an image shot by the camera.

15. A non-transitory computer-readable storage medium storing computer program instructions executable by at least one processor to perform:

sensing a movement of a gamepad from a first position to a second position in a reality scene through an Inertial Measurement Unit (IMU) orientation sensor, wherein the gamepad is an old-fashioned gamepad, the IMU orientation sensor is either plugged to or embedded in the gamepad, and the gamepad is configured to, in an object selection scenario in a VR scene and in response to the movement of the gamepad sensed through the IMU orientation sensor, trigger a movement of a virtual pointer to point at an object according to a proportional relationship between a space of the reality scene and a space of the virtual scene, the VR scene being presented by a head-mounted display;

generating a first position vector based on the movement of the gamepad;

acquiring a first absolute position coordinate of the second position in the reality scene according to a position coordinate of a starting point in the reality scene and the first position vector;

converting the first absolute position coordinate into a first virtual position coordinate in the VR scene;

pointing at a target object located at the first virtual position coordinate in the VR scene, wherein when pointing at the target object, the target object is selected and changed into an operable state; and executing an operation on the target object at the operable state in the VR scene in response to an instruction from a key of the gamepad.

16. The storage medium according to claim 15, wherein acquiring the first absolute position coordinate of the second position in the reality scene according to the position coordinate of the starting point in the reality scene and the first position vector comprises:

acquiring the first absolute position coordinate according to the position coordinate of the starting point, the first position vector and a second absolute position coordinate, wherein the second absolute position coordinate is a coordinate of the first position in the reality scene.

17. The storage medium according to claim 15, wherein before acquiring the first absolute position coordinate of the second position in the reality scene according to the position coordinate of the starting point in the reality scene and the first position vector, the computer program instructions further cause the at least one processor to perform:

acquiring the position coordinate of the starting point in the reality scene through a camera, wherein the starting point is a point in an image shot by the camera.

18. The storage medium according to claim 15, wherein after pointing at the target object located at the first virtual position coordinate in the VR scene, the computer program instructions further cause the at least one processor to perform:

acquiring an operation instruction generated when a key on the gamepad is operated; and executing an operation indicated by the operation instruction on the target object in the VR scene.

19. The storage medium according to claim 15, wherein pointing at the target object oriented by the first virtual position coordinate in the VR scene comprises:

orienting a laser pointer toward the target object located at the first virtual position coordinate in the VR scene, wherein a coordinate of an intersection of a ray originated from the laser pointer and the target object is the first virtual position coordinate.

20. The storage medium according to claim 19, wherein orienting the laser pointer toward the target object in the VR scene comprises:

moving the laser pointer from a third position to a fourth position in the VR scene, wherein the laser pointer orients the target object when being positioned at the fourth position in the VR scene, and when the gamepad is positioned at the first position in the reality scene, the laser pointer is positioned at the third position in the VR scene.

* * * * *